Figure 1:
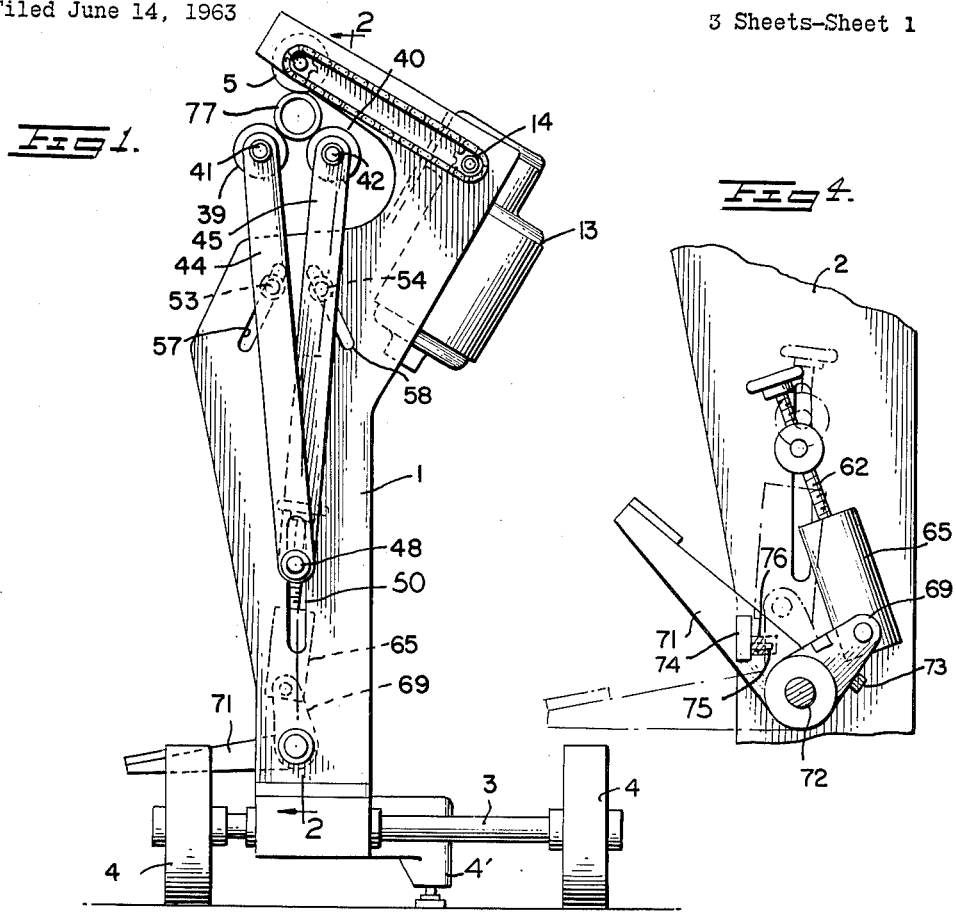

March 15, 1966     J. J. WHITE     3,239,910
TUBE CUTTING AND BURNISHING MACHINE AND METHOD
Filed June 14, 1963     3 Sheets-Sheet 1

March 15, 1966    J. J. WHITE    3,239,910
TUBE CUTTING AND BURNISHING MACHINE AND METHOD
Filed June 14, 1963    3 Sheets-Sheet 2

INVENTOR
John J. White

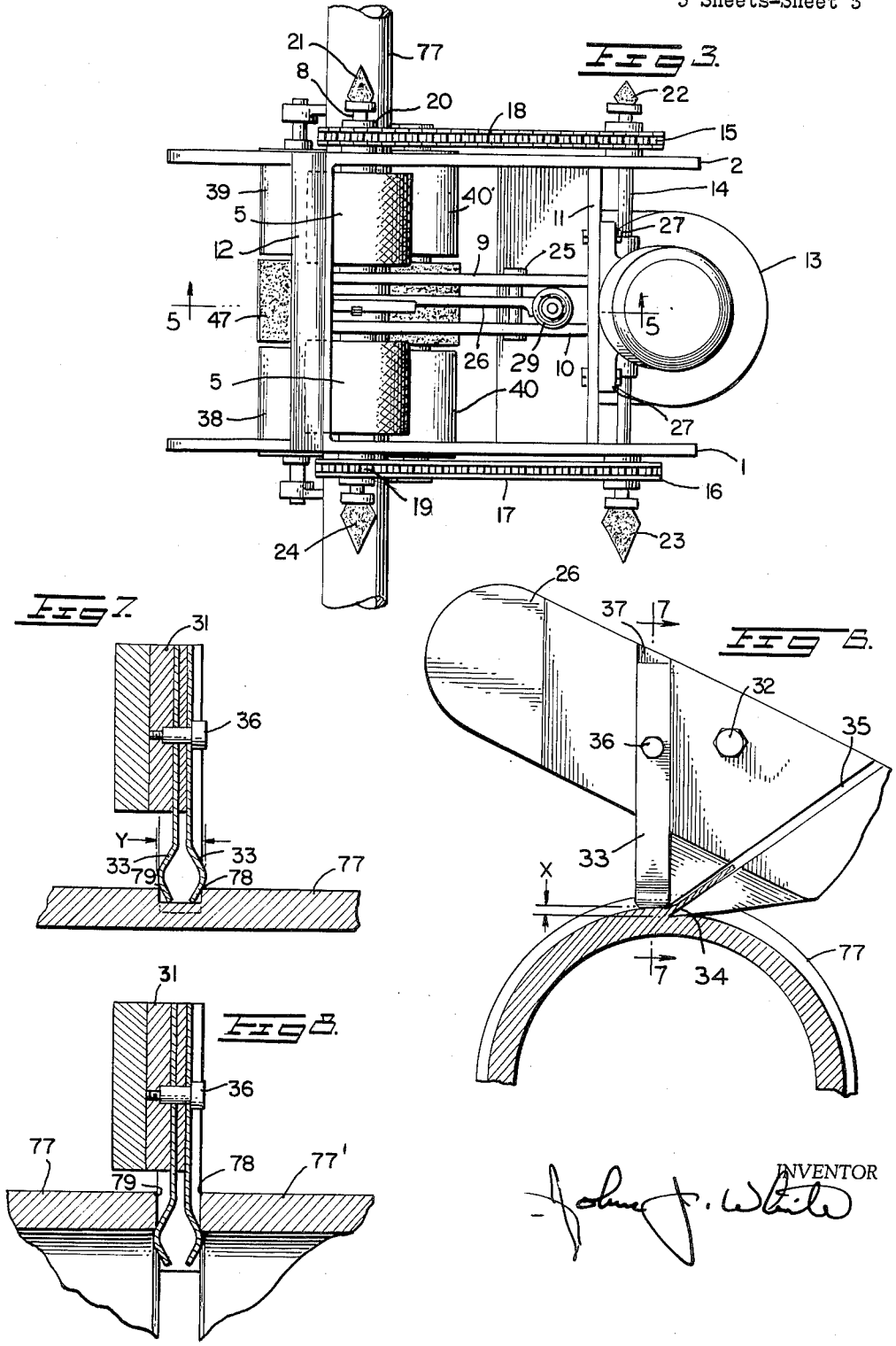

United States Patent Office 3,239,910
Patented Mar. 15, 1966

3,239,910
TUBE CUTTING AND BURNISHING
MACHINE AND METHOD
John J. White, 7405 Glenbrook Road, Bethesda, Md.
Filed June 14, 1963, Ser. No. 287,901
16 Claims. (Cl. 29—90)

The present invention relates in general to devices used for cutting a preselected length of material from a straight length of rod, bar, or tubing stock. The invention relates more particularly to machines or devices used for the cutting to length of ferrous and non-ferrous tubing used in the plumbing, refrigeration and electrical trades.

The prerequisites of a proper tube cutoff for use in the trades mentioned are as follows: the cut shall be perpendicular to the axis of the tube, no burrs shall be present either on the outside or inside diameters, and the outside of the tube shall be free of oxides or other foreign matter for a distance back from the end at least equal to the depth of the "socket" in the tube fitting. The reasons for these requirements are: the presence of burrs or a necked-down inside diameter on a tube end not only impedes the flow of fluids but also traps wastes and foreign matter entrained in the fluids and often results in the eventual stoppage of the tube. The presence of burrs and/or oxides on the outside diameter of the tube impedes and/or prevents the insertion of the tube end into the tube fitting, and/or prevents proper adhesion of the solder. An ineffective solder joint will leak and not only require expensive rework, but also may result in extensive damage.

The most commonly used method of tube preparation is the entirely manual one of cutting the tubing with a hack saw, deburring with a hand scraper, and polishing with a piece of sand paper or sand cloth.

The semi-automatic methods employed heretofore for cutting such tubing either do not attempt to do the job completely, or deform, burr, or otherwise render the workpiece unsuitable for its intended purpose until it is reworked by laborious and expensive manual or semi-manual methods. Perhaps the most widely accepted machine designed for this purpose utilizes the time honored principle of supporting the tube on powered rollers which rotate the tube against a freely rotating, knife-like, cutter. This lenticular cutter is fed into the periphery of the tube by a manually operated screw. This type of cutoff operation invariably results in the inside diameter of the tube being reduced, and the generation of a sharp burr due to the pressure of the cutter. Such machines are usually equipped with power operated tapered reamers over which the ends of the tubing are thrust manually to remove the burr and to restore the inside diameter of the tube to some semblance of its original size. In addition to this it is also necessary to polish the outside diameter of the tube by holding it, and rotating it against a powered, rotating wire brush. This wire brush may also be used to polish the inside diameter of tube fittings.

Thus it can be seen that no fewer than five separate and distinct operations are involved in preparing the ends of a single length of tubing for installation. These operations involve the cumbersome procedure of turning a length of tubing end for end, a process often impossible in cramped quarters and which, therefore, often precludes the use of the machine in the most convenient and economical location.

The objects of this invention are as follows: to provide a machine which will, in one automatic sequence, cut tubing and fully prepare both resulting, adjacent ends for immediate installation. To provide a machine of this nature which is light and portable, and can be moved about easily by one man.

Figure 2:
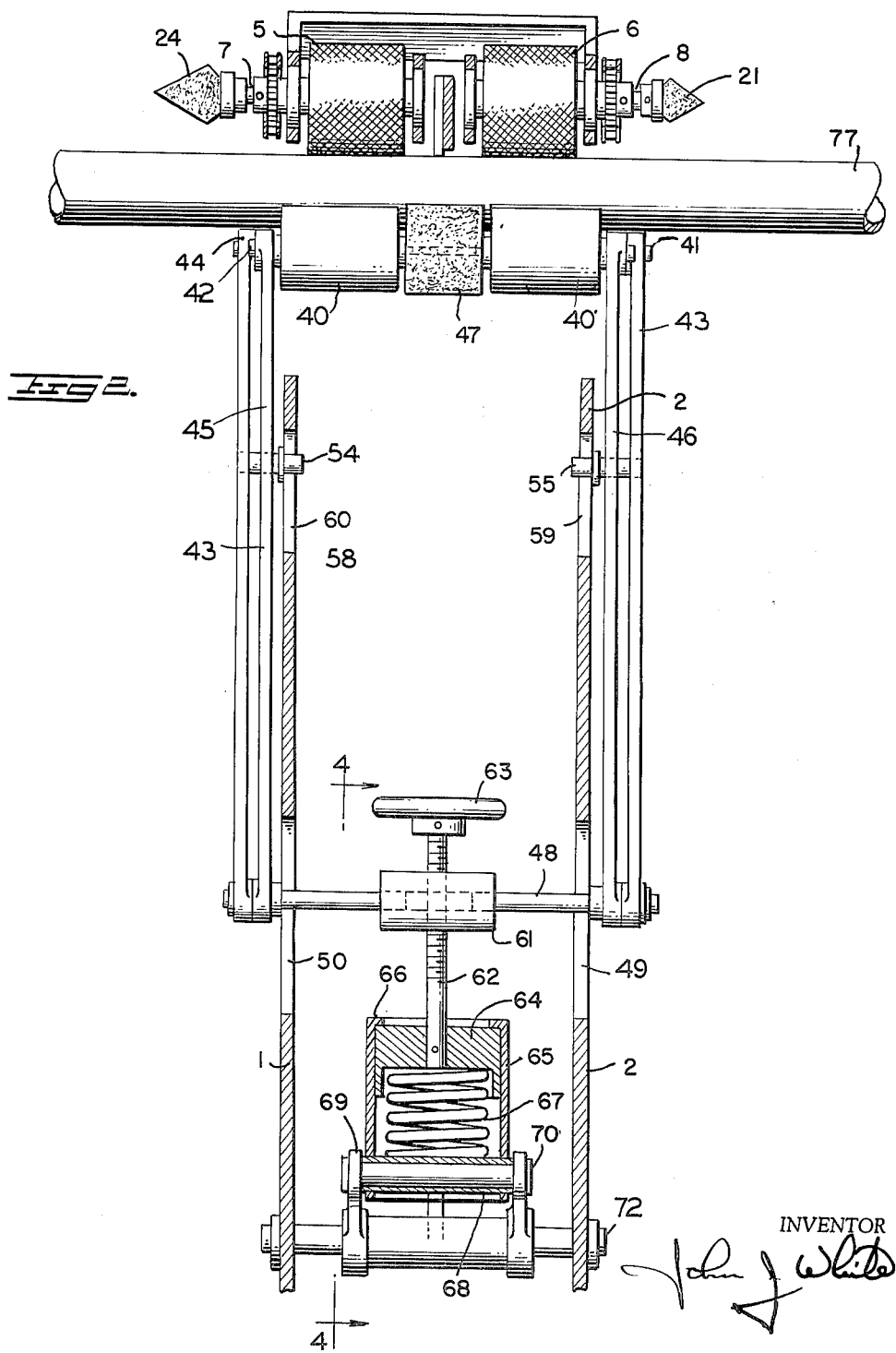

The foregoing and other features of the invention will be more fully described hereinafter and clarified by the accompanying drawings, in which:

FIG. 1 is a side elevational view of the present invention,

FIG. 2 is an enlarged fragmentary vertical sectional view taken on line 2—2 of FIG. 1, FIG. 3 is an enlarged top plan view of the machine, FIG. 4 is an enlarged vertical sectional view taken on line 4—4 of FIG. 2, FIG. 5 is an enlarged fragmentary horizontal sectional view taken on line 5—5 of FIG. 3, FIG. 6 is a still further enlarged view of the left hand portion of FIG. 5, FIG. 7 is a detailed vertical sectional view taken on line 7—7 of FIG. 6, FIG. 8 is a view similar to FIG. 7 showing the device in a subsequent operative position.

In the drawings, 1 and 2 represent the main frame members of the machine. Axle 3 and wheels 4 may be provided to render the machine more portable. Two knurled or stippled rollers 5 and 6 are pinned or keyed to shafts 7 and 8 which are journalled in bearings in main frame members 1 and 2, and in sub-frame members 9 and 10. Members 9 and 10 are in turn supported by members 11 and 12 which are attached to main frame members 1 and 2. Rollers 5 and 6 are driven in a counterclockwise direction, as viewed in FIGS. 1 and 5, by geared motor 13 through its double output shaft 14, to which sprockets or sheaves 15 and 16 are pinned, chains or belts 17 and 18 and sprockets or sheaves 19 and 20, which are pinned to shafts 7 and 8. Wire fitting cleaning brushes 21, 22, 23 and 24 are mounted on the ends of shafts 7, 8 and 14. Geared motor 13 is mounted to member 11 by bolts 27. Pivoted at 25 between members 9 and 10 is cutting tool holder 26 (FIGS. 3, 5 and 6). End 28 of tool holder is normally held against adjustable stop-screw 29 by compression spring 30. Mounted on the opposite end of 26 is tube cutter 31 which is attached to holder 26 by screws 32. Cutter assembly 31 incorporates cutting edge 34, chip passage 35, and spring steel combined cutting depth stop and chamfering tools 33 and 33' which are attached to cutter assembly 31 by shoulder screws 36, and prevented from rotating around screw 36 by virtue of being mounted in slot 37. FIGS. 5, 6, 7 and 8 show the disposition of cutting depth stop and chamfering tools 33 and 33'. It will be observed that 33 and 33' are configured so that the dimension "Y" of the bowed portions thereof exceeds the width of the cutting edge 34 by several thousandths of an inch. In FIG. 4 it will be noted that cutting edge 34 depends below the lower ends of 33 and 33' by the dimension "X." Pointer 51 and scale 52, which is divided in fractions of an inch of cutting edge 34 movement, permit the machine to be adjusted by means of stop screw 29 for cutting tubing of various wall thicknesses as will be described more fully hereinafter.

Rollers 38, 39, 40 and 40' are rotatably mounted on shafts 41 and 42 which are rigidly supported by links 43, 44, 45 and 46. Fixed on shafts 41 and 42 and interposed between rollers 38 and 39, and 40 and 40' are resilient abrasive members 47 and 47', the diameters of which are slightly in excess of the diameters of rollers 38 and 39, and 40 and 40'. Alternately, roller 40 may extend the full axial distance between links 45 and 46 and abrasive member 47' may be omitted.

Lower ends of links 43, 44, 45 and 46 are pivotally mounted on cross member 48, the ends of which are contained in slots 49 and 50 in frame members 1 and 2. Intermediate the ends of links 43, 44, 45 and 46 are mounted guide pins 53, 54, 55 and 56 which are slidably retained in slots 57, 58, 59 and 60 in frame members 1 and 2.

Central portion 61 of cross member 48 has a threaded bore through which is passed threaded rod 62 which is fitted with adjustment knob 63 at its upper end, and piston 64 at its lower end. Piston 64 is contained within cylinder 65, the upper end of which is rolled over as at 66 to prevent piston 64 from being ejected by action of preloaded compression spring 67 which is retained at its lower end by tubular bushing 68 which is passed through a transverse bore in cylinder 65.

Lower end of cylinder 65 is pivotally connected by means of pin 70 to bifurcated lever 69 which is an integral part of foot operated treadle 71 which is pivotally mounted between frame members 1 and 2 at 72. A projection or stop lug 73 is affixed to inside of frame member 2 so as to engage lever 69 when the treadle 71 is in the up or off position. Switch 74, having heavily spring-loaded actuating plunger 75, is mounted to lug 76 which is secured to inside of frame member 2.

The machine is adjusted, or set-up, to receive a particular diameter and wall thickness of tubing as follows: first set the pointer 51 opposite the position on scale 52 corresponding to the wall thickness of the tubing to be cut by rotating screw 29, workpiece 77 is then inserted parallel to and between the upper and lower rollers. Adjustment knob 63 is turned to raise cross member 48, which, through links 43, 44, 45 and 46, raises rollers 38, 39, 40 and 40', and abrasive members 47 and 47' until the length of tubing 77 resting thereon is raised until its periphery almost contacts cutting edge 34, which will be depending below the periphery of rollers 5 and 6 by an amount approximately one and one half times the wall thickness of the tubular workpiece 77.

For convenience sake, rollers 38, 39, 40 and 40' should not be adjusted to a height which will preclude the insertion of the workpiece between the rollers in a direction perpendicular to the axes of the rollers without lowering the rollers by rotating adjustment knob 63.

The machine is now ready for operation. The desired length of tubing, measured from its end to the location of the cutter is inserted between the rollers. At this point treadle 71' is depressed until lever 69 depresses plunger 75 of switch 74 and bears against lug 76. This causes pin joint 70 to go slightly past "center" and treadle 71 is caused to remain in its depressed position. Depression of treadle 71 causes cross member 48 to rise in slots 49 and 50 raising links 43, 44, 45 and 46, which guided by pins 53, 54, 55 and 56, and slots 57, 58, 59 and 60, cause rollers 38, 39, 40 and 40', and abrasive members 47 and 47' to move upwardly and together to retain tube 77 and press it firmly against rollers 5 and 6. Since the links and lever are proportioned so that tube 77 is gripped between the rollers before lever 69 completes its travel, a portion of the travel is utilized in compressing spring 67 contained in cylinder 65. This results in treadle 71 being retained in its over center actuated position; imparts a certain amount of resiliency to the positioning of the lower rollers in order that variations in tubing diameter and roundness may be automatically accommodated; and allows tubular workpieces of diameters somewhat greater and less than that for which the machine has nominally been "set-up" to be processed without resorting to further manipulation of adjustment knob 63.

Workpiece 77, in being raised into contact with rollers 5 and 6, contacts cutting edge 34 and raises it, against load provided by preloaded compression spring 30, until it is positioned flush with the periphery of rollers 5 and 6. Actuation of switch 74 by lever 69 energizes geared motor 13 which, through shaft 14, sprockets 15, 16, 19 and 20, and chains 17 and 18, causes knurled or stippled drive rollers 5 and 6 to rotate counterclockwise.

Tube 77 being firmly pressed against rollers 5 and 6 by rollers 38, 39, 40 and 40' is caused to rotate clockwise. Cutting edge 34 digs into the periphery of 77 until cutting depth stop and chamfering tools 33 and 33' contact the periphery of workpiece 77. Continued rotation of 77 results in the generation of a continuous chip or shaving of "X" thickness (FIG. 6) which passes out through chip passage 35 until the full wall thickness of the tube is cut through.

As tools 33 and 33' pass down through the tube wall, the lower angularly disposed edges of the outwardly bowed portions of the tools, which extend slightly beyond the width of the cut made by cutting edge 34, resiliently scrape against the sharp corners 78 and 79 produced at the periphery of the tube 77 and "break" or chamfer the corners. As cutting edge 34 passes still deeper into the tube wall under the influence of spring 30, the bowed portions of 33 and 33' are urged toward each other as they pass deeper into the groove produced by 34 and continue to control the depth of the cut being made by 34 until 34 breaks completely through the wall of tube 77.

At this point, under the urging of spring 30, the cutter assembly 31 abruptly drops until end 28 of tool holder 26 contacts stop screw 29. At this point two pieces rather than one piece of tubing are present. Tube 77 is held between rollers 6, 39 and 40'. Tube 77' is held between rollers 5, 38 and 40. Both pieces of tubing continue to rotate, and the upper angularly disposed edges of tools 33 and 33' bear resiliently against the inner peripheral corners of the tubes 77 and 77' scraping away the slight burr produced by breakthrough of cutting edge 34 and slightly chamfering said corners.

The portions of 33 and 33' which extend furthest laterally do not have sharp edges but are rounded so as to run smoothly against ends of tubes 77 and 77'. The chamfer cutting edges of 33 and 33' (both above and below the most laterally extensive portions) are sharp and/or covered with a granular coating of tungsten carbide or other wear-resistant substance.

It will be noted that the "bottoming" adjustment of the cutter is not particularly critical and need not be disturbed over a considerable range of tubing wall thicknesses.

Stationary abrasive member 47 (and 47' if used) has been bearing against the periphery of the rotating tube(s) during the cutting process and has removed all dirt, oxides, etc., and has polished the adjacent ends of tubes 77 and 77' so that they may be inserted in fittings and soldered effectively without further preparation.

Resilient abrasive member 47 may take the form of a wire brush as shown, a soft rubber cylinder faced with sand cloth or the like, a leaf spring with an abrasive coating, or any other form without departing from the spirit of the invention.

After the tubes have bade several revolutions following breakthrough of the cutter to allow chamfering of the inside corners, the machine may be stopped and the tubing released by "breaking" the over center linkage at 70 with a tap of the operator's toe.

Thus it can be seen that one operation of the subject machine quickly produces two fully prepared tubing ends without the necessity of turning lengths of tubing end for end or other laborious or clumsy procedures.

During the cutting process, the machine operator, whose hands are completely free, may grasp a tube fitting in either hand and polish the inside dameters thereof by holding them over rotating fitting brushes 19, 21 22 and/ or 23.

While the subject machine is shown powered by an electric motor, it is obvious that other power means, including manually operated cranks or the like may be substituted without departing from the spirit of the invention.

I claim:

1. A machine for severing tubular workpieces comprising a plurality of parallel roller means disposed to retain said tubular workpiece, means to rotate at least one of said roller means to cause said tubular workpiece to rotate about its own axis, a shaving type cutter positioned to bear operatively against the periphery of said workpiece intermediate the axial length of said roller means, resilient means to urge said cutter into operative engagement with said workpiece, and including cutting depth limiting means attached to said cutter and disposed to contact the periphery of the rotating workpiece and subsequently the bottom of the groove in said periphery produced by action of said cutter, said limiting means being so proportioned to allow the cutting edge of said cutter to project further toward the centerline of said tubular workpiece than the workpiece contacting portion of said limiting means.

2. The machine of claim 1 wherein said cutting depth limiting means include a plurality of members which are substantially non-deformable in the directions perpendicular to the axis, and tangent to the periphery of said tubular workpiece, and resiliently deformable in the direction parallel to the axis of said tubular workpiece, said members having angularly disposed portions adjacent their workpiece contacting ends, portions of which extend beyond the width of said cutting edge.

3. The machine of claim 2 including abrasive means disposed to bear operatively aaginst the periphery of the workpiece in the region contacted by said cutter.

4. A machine for severing tubular workpieces comprising a plurality of parallel roller means disposed to retain said tubular workpiece, means to rotate at least one of said roller means to cause said tubular workpiece to rotate about its own axis, a shaving type cutter positioned to bear operatively against the periphery of said workpiece intermediate the axial length of said roller means, resilient means to urge said cutter into operative engagement with said workpiece, mechanical stop means disposed to limit the total in-feed of said cutter, and including cutting depth limiting means attached to said cutter and disposed to contact the periphery of the rotating workpiece and subsequently the bottom of the groove in said periphery produced by action of said cutter, said limiting means being so proportioned to allow the cutting edge of said cutter to project further toward the centerline of said tubular workpiece than the workpiece contacting portion of said limiting means.

5. The machine of claim 4 wherein said cutting depth limiting means include a plurality of members which are substantially non-deformable in the directions perpendicular to the axis, and tangent to the periphery of said tubular workpiece, and resiliently deformable in the direction parallel to the axis of said tubular workpiece, said members having angularly disposed portions adjacent their workpiece contacting ends, portions of which extend beyond the width of said cutting edge.

6. The machine of claim 5 including abrasive means disposed to bear operatively against the periphery of the workpiece in the region contacted by said cutter.

7. The machine of claim 4 including abrasive means disposed to bear operatively against the periphery of the workpiece in the region contacted by said cutter.

8. The machine of claim 1 including abrasive means disposed to bear operatively against the periphery of the workpiece in the region contacted by said cutter.

9. A machine for severing tubular workpieces comprising a plurality of parallel roller means disposed to retain said tubular workpiece, means to rotate at least one of said roller means to cause said tubular workpiece to rotate about its own axis, a shaving type cutter positioned to bear operatively against the periphery of said workpiece intermediate the axial length of said roller means, resilient means to urge said cutter into operative engagement with said workpiece, and including abrasive means disposed to bear operatively against the periphery of the workpiece in the region contacted by said cutter.

10. A machine for severing tubular workpieces comprising a plurality of parallel roller means disposed to retain said tubular workpiece, means to rotate at least one of said roller means to cause said tubular workpiece to rotate about its own axis, a shaving type cutter positioned to bear operatively against the periphery of said workpiece intermediate the axial length of said roller means, resilient means to urge said cutter into operative engagement with said workpiece, mechanical stop means disposed to limit the total in-feed of said cutter, and including abrasive means disposed to bear operatively against the periphery of the workpiece in the region contacted by said cutter.

11. The method of severing and preparing the resulting ends of cylindrical tubing consisting of rotating said tubing about its longitudinal axis, feeding a cutting tool through the wall of said tubing, holding and continuing to rotate the resulting two pieces of tubing, and chamfering the inside and outside peripheral corners of the adjacent ends of said two pieces of tubing by inserting a resilient chamfering means between said adjacent ends.

12. The method of claim 11 including the concurrent operation of cleaning the periphery of the ends of said resulting two pieces of tubing.

13. A material cutting tool, adapted for use on planer, shaper and lathe type machines, said cutting tool member having a cutting edge, cutting depth limiting means associated with said cutting tool member disposed so as to precede said cutting edge in its relative travel over a workpiece, and to slide on said workpiece and on the bottom of the groove in said workpiece made by said cutting edge.

14. A material cutting tool as described in claim 13 wherein a portion of said cutting depth limiting means projects laterally beyond the width of said cutting edge and is disposed to chamfer the corner of said groove made by said cutting edge in said workpiece.

15. A material cutting tool as described in claim 14 wherein said cutting depth limiting means is laterally resilient, permitting it to pass through said groove and bear against the inner corner of said groove.

16. The method of severing and preparing the resulting ends of cylindrical tubing consisting of rotating said tubing about its longitudinal axis, feeding a cutting tool through the wall of said tubing, and simultaneously polishing the periphery of said tubing on both sides of the point of contact of said cutting tool.

References Cited by the Examiner

UNITED STATES PATENTS

| 1,162,581 | 11/1915 | Domizi | 29—28 |
| 1,256,556 | 2/1918 | Hedges | 29—565 |
| 2,535,653 | 12/1950 | Schaefer | 29—95 X |
| 2,732,612 | 1/1956 | Hallock | 29—90 |
| 3,146,526 | 9/1964 | Bollin | 29—564 |

RICHARD H. EANES, JR., *Primary Examiner.*